United States Patent
Yao

(10) Patent No.: US 10,908,661 B2
(45) Date of Patent: Feb. 2, 2021

(54) METHOD FOR OPTIMIZING FAN SPEED CONTROL OF A COMPUTER SYSTEM

(71) Applicant: MITAC COMPUTING TECHNOLOGY CORPORATION, Hsinchu (TW)

(72) Inventor: Ko-Yi Yao, Taoyuan (TW)

(73) Assignee: Mitac Computing Technology Corporation, Hsinchu (TW)

( * ) Notice: Subject to any disclaimer, the term of this patent is extended or adjusted under 35 U.S.C. 154(b) by 120 days.

(21) Appl. No.: 16/414,596

(22) Filed: May 16, 2019

(65) Prior Publication Data
US 2019/0391624 A1    Dec. 26, 2019

(30) Foreign Application Priority Data

Jun. 21, 2018    (TW) .............................. 107121241 A

(51) Int. Cl.
  *G06F 1/20*    (2006.01)
  *G05B 15/02*    (2006.01)
(52) U.S. Cl.
  CPC ............. *G06F 1/206* (2013.01); *G05B 15/02* (2013.01)
(58) Field of Classification Search
  CPC ........ G05B 15/02; G06F 1/1694; G06F 1/206
  See application file for complete search history.

(56) References Cited

U.S. PATENT DOCUMENTS

| | | | |
|---|---|---|---|
| 2013/0258521 A1* | 10/2013 | Yang .................... | G11B 33/144 360/97.13 |
| 2015/0019917 A1* | 1/2015 | Fahimi ................ | G06F 11/3058 714/42 |

FOREIGN PATENT DOCUMENTS

| | | |
|---|---|---|
| CN | 101876320 A | 11/2010 |
| CN | 102192175 A | 9/2011 |
| CN | 103827774 A | 5/2014 |
| JP | 2012094214 A * | 10/2010 ............. G11B 33/14 |

OTHER PUBLICATIONS

Search Report appended to an Office Action, which was issued to Chinese counterpart application No. 201810931748.1 by the CNIPA dated Jul. 27, 2020, with an English translation thereof.

* cited by examiner

*Primary Examiner* — Chad G Erdman
(74) *Attorney, Agent, or Firm* — Lewis Roca Rothgerber Christie LLP

(57) ABSTRACT

A method is provided for optimizing fan speed control of a computer system that includes a fan unit, a temperature sensor, a control unit to control operation of the fan unit, and a disk storage unit. A forbidden range corresponding to a range for a fan speed is determined based on a relationship between fan speed and vibration of the disk storage unit. An optimized fan control table is generated based on a reference table relating to a relationship between ambient temperature and fan speed. The optimized fan control table is generated by making a part of the ambient temperature values in the reference table change to corresponding to a predetermined fan speed not smaller than a fan speed value corresponding to an upper limit of the forbidden range.

12 Claims, 4 Drawing Sheets

METHOD FOR OPTIMIZING FAN SPEED CONTROL OF A COMPUTER SYSTEM

CROSS-REFERENCE TO RELATED APPLICATION

This application claims priority of Taiwanese Invention Patent Application No. 107121241, filed on Jun. 21, 2018.

FIELD

The disclosure relates to a method for optimizing fan speed control of a computer system.

BACKGROUND

In order to ensure accuracy of read/write operation, it is common for a hard disk drive to have a sensor to detect vibration, so as to adjust control of the disk read-and-write head of the hard disk drive accordingly. For example, when the sensor detects that rotational vibration is greater than a predetermined threshold, the hard disk drive may lower the read/write speed.

Rotation of cooling fans of a computer system brings vibration, which may be transmitted to the hard disk drive via a computer case of the computer system, possibly bringing about the need to lower the read/write speed of the hard disk drive. Therefore, performance of the computer system may be adversely affected by operation of cooling fans.

SUMMARY

Therefore, an object of the disclosure is to provide a method for optimizing fan speed control of a computer system, so as to reduce the influence on read/write speed of a disk storage unit of the computer system.

According to one aspect of the disclosure, the method is provided for optimizing fan speed control of a computer system that includes a fan unit, a control unit to control operation of the fan unit, and a disk storage unit. The method includes: by a computer device, obtaining a reference vibration table that includes multiple vibration values of the disk storage unit respectively corresponding to fan speed values of a first group, of the fan unit; by a computer device, determining, based on a greatest one of the vibration values in the reference vibration table, a forbidden range corresponding to a range of fan speed values for a fan speed of the fan unit; by a computer device, obtaining a reference fan control table that includes multiple ambient temperature values corresponding to a second group of fan speed values of the fan speed of the fan unit; by a computer device, generating an optimized fan control table based on the reference fan control table and the forbidden range by making a part of the ambient temperature values in the reference fan control table correspond to a specific fan speed value; and by the control unit, controlling a fan speed of the fan unit based on the optimized fan control table. In the reference fan control table, said part of the ambient temperature values is in correspondence to a part of the second group of fan speed values that corresponds to the forbidden range determined based on the reference vibration table. The specific fan speed value is not smaller than an upper limit of the range for the fan speed that corresponds to the forbidden range.

According to another aspect of the disclosure, the method includes: by a computer device, obtaining a reference vibration table that associates fan speed values of a first group, of the fan unit with multiple vibration values of the disk storage unit, respectively; by a computer device, determining, based on those of the vibration values that are greater than a predetermined threshold value in the reference vibration table, a forbidden range corresponding to a range for a fan speed of the fan unit; by a computer device, obtaining a reference fan control table that includes multiple ambient temperature values corresponding to a second group of fan speed values of the fan speed of the fan unit; by a computer device, generating an optimized fan control table based on the reference fan control table and the forbidden range by making a part of the ambient temperature values in the reference fan control table change to corresponding to a specific fan speed value; and by the control unit, controlling a fan speed of the fan unit based on the optimized fan control table. In the reference fan control table, said part of the ambient temperature values is in correspondence to a part of the second group of fan speed values that corresponds to the forbidden range determined based on the reference vibration table. The specific fan speed value is not smaller than an upper limit of the range for the fan speed that corresponds to the forbidden range.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
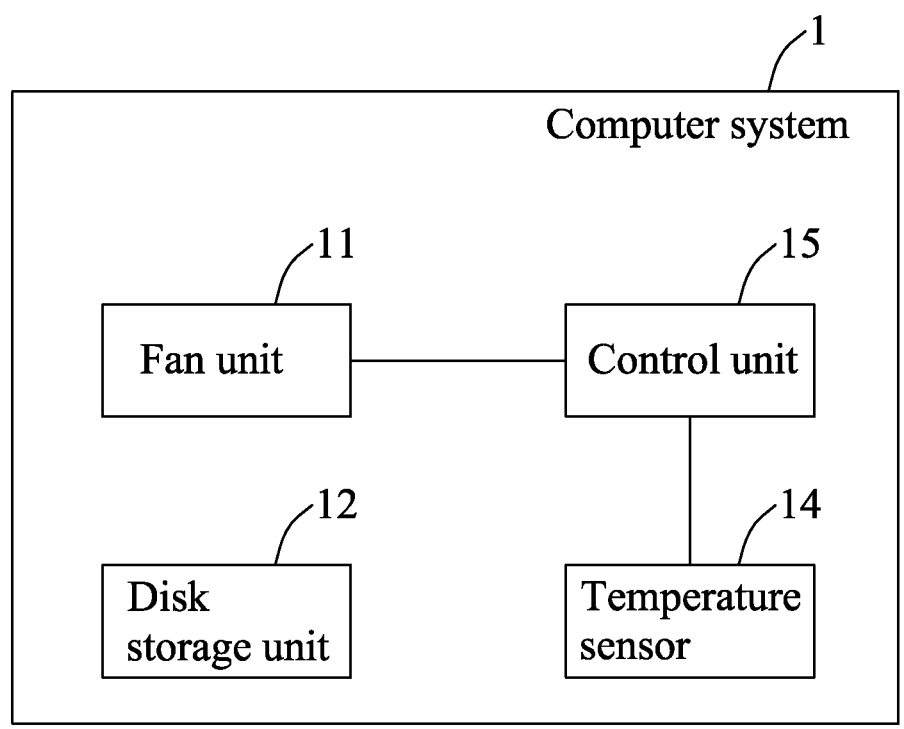
FIG. 1 is a block diagram illustrating a computer system including a fan unit and a disk storage unit, of which fan speed control is to be optimized using an embodiment of the method according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the method for optimizing fan speed control according to this disclosure is adapted for implementation in a computer system 1. The computer system 1 includes a fan unit 11, a control unit 15, and a disk storage unit 12. In this embodiment, the computer system 1 is exemplified as a host server, but this disclosure is not limited in this respect. For example, the computer system 1 may be a desktop computer, a notebook computer, or the like in other embodiments, and the embodiment of the method according to this disclosure is applicable to any device that has a fan unit and a disk storage unit. In this embodiment, the control unit 15 is a baseboard management controller (BMC). In other embodiments, the control unit 15 may be a programmable logic device, such as a complex programmable logic device (CPLD) or a field programmable gate array (FPGA).

To implement the embodiment of the method for optimizing fan speed control, a temperature sensor 14 is used to detect an ambient temperature at a target location, such as nearby a central processing unit (CPU), a particular location on a motherboard, etc. In this embodiment, the temperature sensor 14 is also included in the computer system 1, but this disclosure is not limited in this respect. The fan unit 11 includes one or more fans, such as a cooling fan mounted to a case of the computer system 1. The control unit 15 receives the ambient temperature detected by the temperature sensor 14, and generates a control signal that is provided to the fan unit 11 for controlling a fan speed (rotation speed) of at least one of the fan(s) of the fan unit 11, in order to maintain the ambient temperature of the computer system 1 so as to meet a design specification of the computer system 1. The disk storage unit 12 may be, for example, a hard disk drive (HDD), an optical disk drive (ODD, which may be used in, for instance, CD players, DVD players, Blu-ray players, etc.), or a combination of multiple hard disk drives and/or optical disk drives, or other kinds of storage devices that have a read-and-write head. In this embodiment, the fan unit 11 is exemplified to include one fan, but this disclosure is not limited in this respect.

Figure 2:
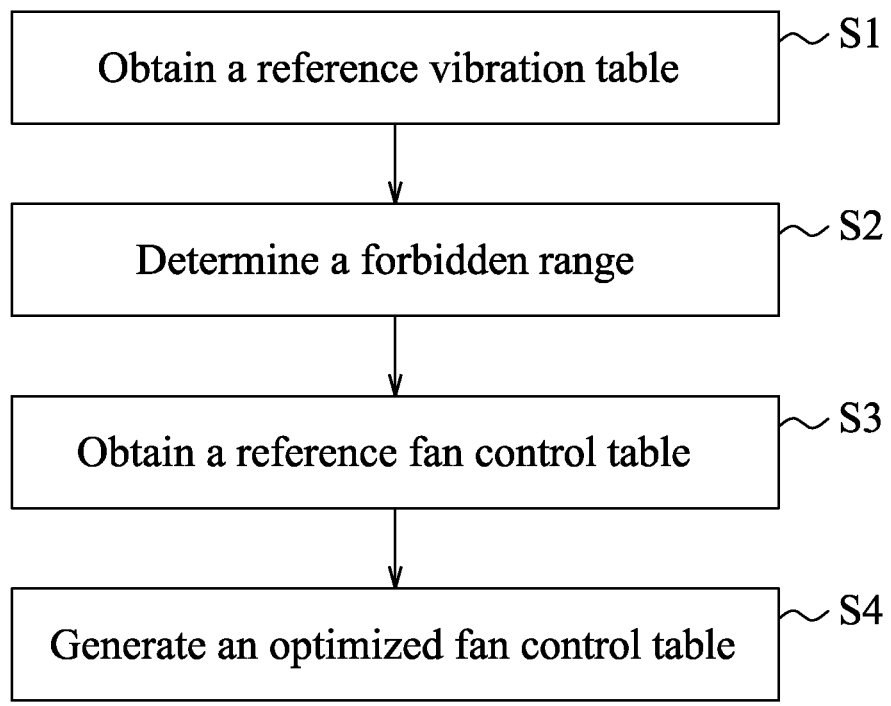
FIG. 2 is a flow chart illustrating steps of how to optimize fan speed control for the computer system.

FIG. 2 exemplifies how to optimize fan speed control for the computer system 1 according to this disclosure.

In step S1, a computer device (not shown) is used to obtain a control parameter table and a reference vibration table, for example, by user input, or from a storage device (e.g., a USB drive, a remote storage of a remote server and the like). The control parameter table associates fan speed values of a first group respectively with parameter values of a first group. The parameter values are values of a fan control parameter relevant to a control signal used to control the fan speed of the fan unit 11. In this embodiment, the fan control parameter is a duty cycle of the control signal. Table 1 shows an exemplary control parameter table for this embodiment. The correspondences between the fan speed values of the first group and the parameter values of the first group are pre-established and stored in a memory medium (e.g., a flash memory) (not shown) that is accessible by the control unit 15. The memory medium may either be built within the control unit 15 or be part of the computer system 1 but external to the control unit 15.

TABLE 1

| Duty cycle | Fan speed (rpm) |
|---|---|
| 0% | 3000 |
| 10% | 4440 |
| 20% | 5880 |
| 30% | 10280 |
| 40% | 17640 |
| 50% | 25000 |
| 60% | 32360 |
| 70% | 39720 |
| 80% | 47080 |
| 90% | 54440 |

Figure 3:
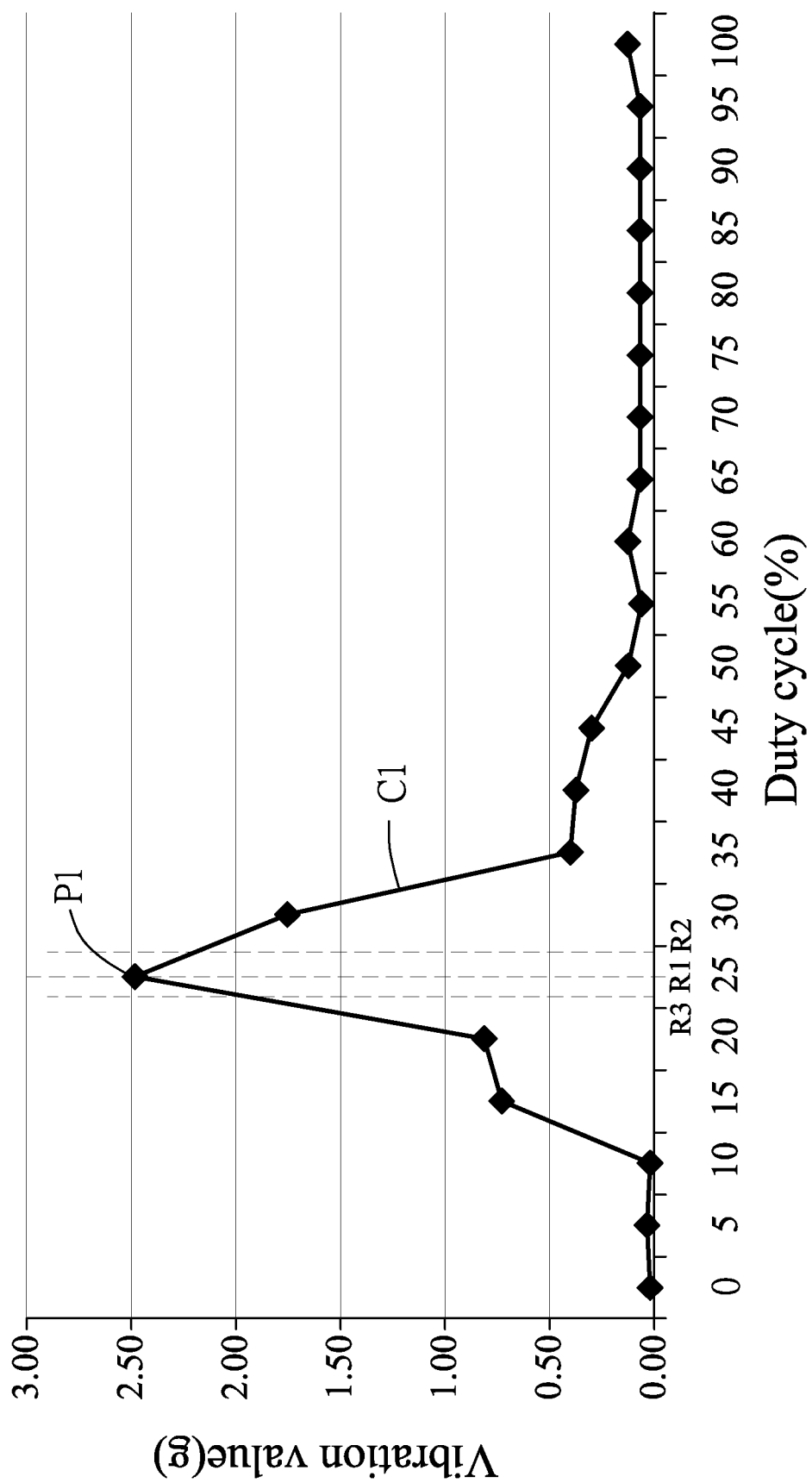
FIG. 3 is a plot illustrating a relationship between duty cycle and vibration of a reference vibration table used in the embodiment.

The reference vibration table includes multiple vibration values of the disk storage unit 12, all or some of which respectively correspond to the fan speed values of the first group of the fan unit 11. Each of said all or some of the vibration values in the reference vibration table represents a magnitude of vibration of the disk storage unit 12 resulting from rotation of the fan unit 11 at the corresponding fan speed value. Table 2 shows an exemplary reference vibration table for this embodiment. The exemplary reference vibration table associates multiple vibration values respectively with a plurality of parameter values that include the first group of parameter values as exemplified in Table 1. According to Table 1 and Table 2, it is known that, in Table 2, those of the vibration values that correspond to the first group of parameter values correspond to the first group of fan speed values in Table 1, respectively. The correspondences between the parameter values and the vibration values in the reference vibration table are pre-established and stored in a memory medium (e.g., a flash memory) (not shown) that is accessible by the control unit 15. The memory medium may either be built within the control unit 15 or be a part of the computer system 1 but external to the control unit 15. FIG. 3 exemplarily illustrates the correspondences between the duty cycle values (the first group of parameter values) and the vibration values according to Table 2, where a curve (C1) connects the points representing the vibration values respectively corresponding to the duty cycle values of 0%, 5%, 10%, . . . , 100%.

TABLE 2

| Duty cycle | Vibration value (g) |
|---|---|
| 0% | 0.01 |
| 5% | 0.02 |
| 10% | 0.01 |
| 15% | 0.75 |
| 20% | 0.8 |
| 25% | 2.5 |
| 30% | 1.75 |
| 35% | 0.4 |
| 40% | 0.375 |
| 45% | 0.3 |
| 50% | 0.2 |
| 55% | 0.05 |
| 60% | 0.2 |
| 65% | 0.05 |
| 70% | 0.05 |
| 75% | 0.05 |
| 80% | 0.05 |
| 85% | 0.05 |
| 90% | 0.05 |
| 95% | 0.05 |
| 100% | 0.2 |

In this embodiment, the vibration value is represented in standard gravity, which is used as a unit of acceleration. The fan unit 11 may cause vibration of the disk storage unit 12 in a single direction or multiple directions (e.g., three directions that are perpendicular to each other). Therefore, the vibration value may be representative of a vibration magnitude in a single direction, or a vector sum of multiple vibration magnitudes respectively in multiple directions, but this disclosure is not limited in this respect.

In this embodiment, the fan unit 11 is mounted to a case (not shown) of the computer system 1. When the fan unit 11 is in operation, the resultant vibration may be transmitted via the case and cause the disk storage unit 12 to vibrate. Following the exemplary control parameter table shown in Table 1, a frequency of vibration (in Hertz) resulting from operation of the fan unit 11 would be equal to the fan speed (in rpm) divided by 60, as shown in Table 3.

TABLE 3

| Duty cycle | Fan speed (rpm) | Vibrational frequency (Hz) |
|---|---|---|
| 0% | 3000 | 50 |
| 10% | 4440 | 74 |
| 20% | 5880 | 98 |
| 30% | 10280 | 171 |
| 40% | 17640 | 294 |

TABLE 3-continued

| Duty cycle | Fan speed (rpm) | Vibrational frequency (Hz) |
|---|---|---|
| 50% | 25000 | 417 |
| 60% | 32360 | 539 |
| 70% | 39720 | 662 |
| 80% | 47080 | 785 |
| 90% | 54440 | 907 |

The vibrational frequencies shown in Table 3 are fundamental frequencies of the vibration when the fan unit 11 is in operation. For a fan that includes N number of fan blades, due to imperfection of fan design, the resultant vibration may include vibration at a harmonic frequency that is N times the fundamental frequency, where N is a positive integer. Generally, a magnitude of vibration at the fundamental frequency is greater than that at the harmonic frequency, so vibration at the fundamental frequency makes a greater impact on the disk storage unit 12 than vibration at the harmonic frequency. In one example where the fan unit 11 is a combination of a fan with five blades and a fan with seven blades, when the fan unit 11 operates at a fan speed of 5880 rpm (i.e., both of the fans operate at the fan speed of 5880 rpm) in response to a control signal with a duty cycle of 20%, the resultant vibration includes a vibration component at a fundamental frequency of 98 Hz, a vibration component at a first harmonic frequency of 490 Hz and a vibration component at a second harmonic frequency of 686 Hz.

In step S2, the computer device determines, based on a part of the vibration values in the reference vibration table, a forbidden range for the fan control parameter (i.e., the duty cycle in this embodiment), where said part of the vibration values includes the greatest one of the vibration values and the forbidden range has a lower limit and an upper limit. It is known from Table 1 that the fan control parameter and the fan speed of the fan unit 11 have a correspondence relationship, and thus the forbidden range for the fan control parameter would correspond to a range for the fan speed of the fan unit 11, which is assumed to range between a first fan speed and a second fan speed that respectively correspond to the lower limit and the upper limit of the forbidden range, where the second fan speed is greater than the first fan speed in this embodiment. In this embodiment, the parameter value that corresponds to the greatest one of the vibration values in the reference vibration table serves as a center value of the forbidden range, and the upper limit and the lower limit of the forbidden range are determined based on a tolerance for the fan speed value corresponding to the greatest one of the vibration values in the reference vibration table. In some embodiments, the center value of the forbidden range does not necessarily correspond to the greatest one of the vibration values in the reference vibration table. Following the example shown in FIG. 3, the forbidden range for the duty cycle may be defined to be from 23.5% (R3) to 27.5% (R2), which includes the duty cycle value of 25% (R1) that corresponds to the greatest one of the vibration values in the reference vibration table (Table 2). In some embodiments, the forbidden range may be determined based on those of the vibration values that are greater than a predetermined threshold value in the reference vibration table. In some implementations, two or more forbidden ranges may be determined (for example, in a case that those of the vibration values that are greater than the predetermined threshold value are rather scattered), and each forbidden range has its own upper limit and lower limit. Following the example shown in FIG. 3, assuming that the predetermined threshold value is 2 g, the forbidden range may be defined as a range of the duty cycle values between 23% and 28%. When the control unit 15 receives the ambient temperature sensed by the temperature sensor 14 and generates the control signal to control the fan speed of at least one fan of the fan unit 11, the control unit 15 will avoid making the fan control parameter fall within the forbidden range, so that the fan speed of the fan unit 11 will not fall within the range that corresponds to the forbidden range and that corresponds to the greatest vibration value in the reference vibration table.

For example, a maximum of the vibration values in FIG. 3 is 2.5 g, corresponding to a duty cycle of 25% (see a point P1). Based on Table 1 or Table 3, a fan speed value corresponding to the duty cycle of 25% may be calculated as 8080 rpm by performing interpolation between the fan speed values that correspond to the duty cycle values of 20% and 30%. Assuming that a tolerance for the fan speed value at 8080 rpm is ±880 rpm according to a specification of the fan unit 11, i.e., a fan speed range that corresponds to the forbidden range for the fan control parameter is between 7200 rpm (first fan speed) and 8960 rpm (second fan speed), a corresponding forbidden range for the duty cycle may be calculated by performing interpolation between the fan speed values that correspond to the duty cycle values of 20% and 30% to obtain duty cycle values that correspond to the first and second fan speeds. For example, when a linear interpolation is performed, the lower limit of the forbidden range is obtained according to (7200−5880)/(10280−5880)*(30%−20%)+20%=23%, and the upper limit of the forbidden range is obtained according to (8960−5880)/(10280−5880)*(30%−20%)+20%=27%, thus the forbidden range is obtained to be from 23% to 27% (i.e., 25%±2% in this example).

In step S3, the computer device obtains, for example, by user input, or from a storage device (e.g., a USB drive and the like), a reference fan control table that includes multiple ambient temperature values that are obtained by the temperature sensor 14 and that correspond to a second group of fan speed values of the fan unit 11. In this embodiment, the reference fan control table associates the ambient temperature values with parameter values of a second group, of the fan control parameter, which respectively correspond to the fan speed values of the second group. The reference fan control table is pre-established based on an environment the computer system 1 will be placed in. Table 4 shows an exemplary reference fan control table for this embodiment. As an example, the control signal should have a duty cycle of 60% when the resultant ambient temperature is 49 degrees Celsius; and, when the duty cycle is raised to 80%, the ambient temperature is expected to be reduced to 48 degrees Celsius. The reference fan control table is stored in a memory medium (e.g., a flash memory) (not shown) that is accessible by the control unit 15. The memory medium may either be built within the control unit 15 or be a part of the computer system 1 but external to the control unit 15.

TABLE 4

| Duty cycle | Ambient temperature |
|---|---|
| 25% | 56° C. |
| 30% | 55° C. |
| 35% | 53° C. |
| 50% | 50° C. |
| 60% | 49° C. |
| 80% | 48° C. |

In step S4, the computer device generates an optimized fan control table based on the reference fan control table and the forbidden range by making a part of the ambient temperature values in the reference fan control table change to corresponding to a specific fan speed value. Said part of the ambient temperature values in the reference fan control table is in correspondence to a part of the second group of the fan speed values that corresponds to the forbidden range. The specific fan speed value is not smaller than an upper limit of the range for the fan speed that corresponds to the forbidden range. In detail, the optimized fan control table is generated by re-associating said part of the ambient temperature values that is, in the reference fan control table, associated with a part of the second group of the parameter values that falls within the forbidden range, with a predetermined parameter value for the fan control parameter, where the predetermined parameter value corresponds to the specific fan speed value. In this embodiment, the predetermined parameter value is a duty cycle value not smaller than the upper limit of the forbidden range, so the specific fan speed value is not smaller than the second fan speed (i.e., an upper limit of the fan speed range that corresponds to the forbidden range).

Figure 4:
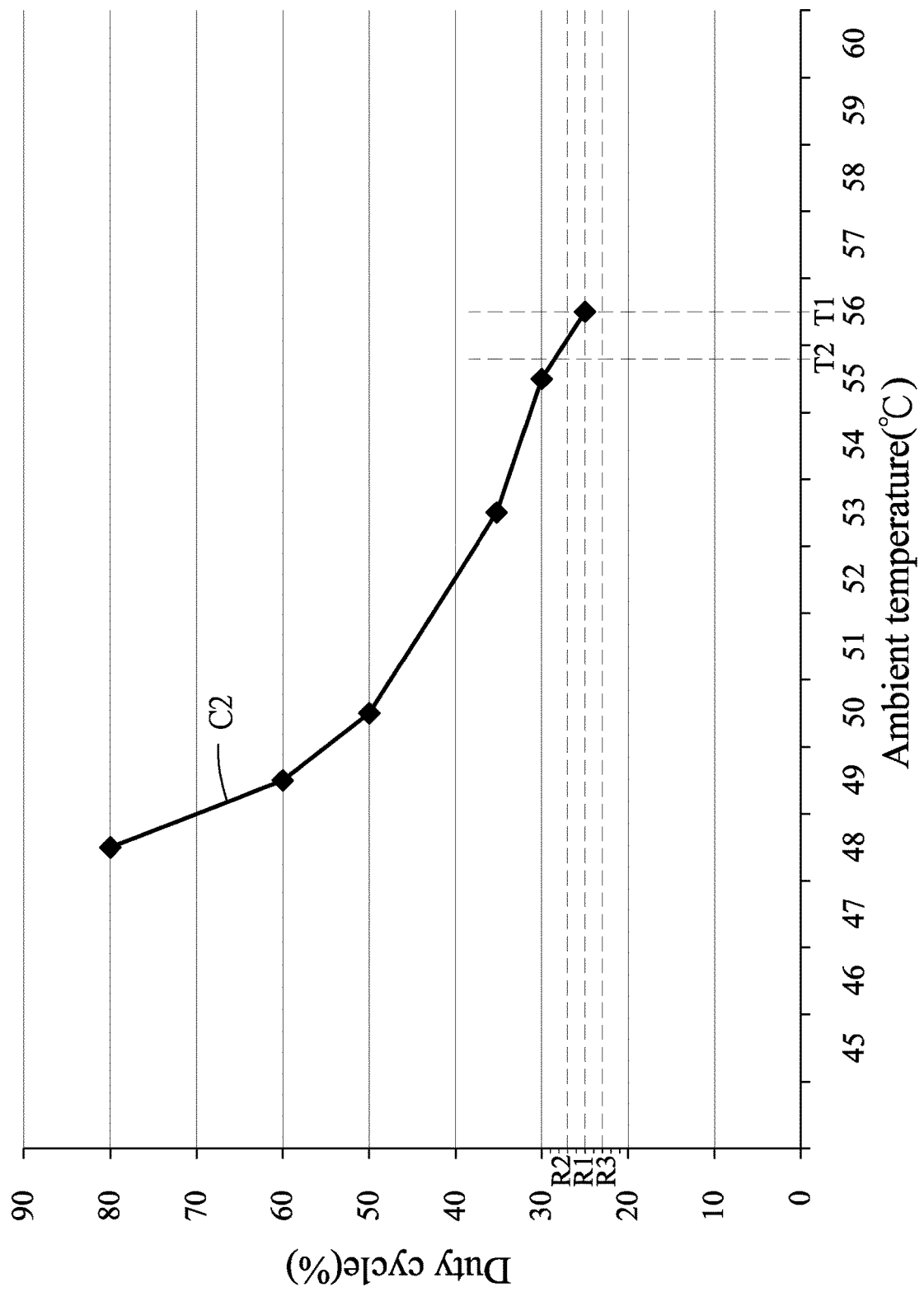
FIG. 4 is a plot illustrating a relationship between ambient temperature and duty cycle of a reference fan control table used in the embodiment.

FIG. 4 exemplarily shows a relationship between the duty cycle of the control signal and the ambient temperature according to Table 4. A curve (C2) connects the points representing temperature values respectively corresponding to duty cycle values of 25%, 30%, 35%, 50%, 60% and 80%. Following the previous example where the forbidden range is between 23% (R3) and 27% (R2), the optimized fan control table is generated by re-associating the ambient temperature value of 56 degrees Celsius that, in Table 4, corresponds to the duty cycle value of 25%, which falls within the forbidden range, with the duty cycle value of 27% that is equal to the upper limit of the forbidden range. The ambient temperature value corresponding to the duty cycle value of 27% can be obtained by performing interpolation between the ambient temperature values corresponding to the duty cycle values of 25% and 30%, and is calculated as 55.6 degrees Celsius (T2), which is lower than 56 degrees Celsius (T1) that corresponds to the duty cycle value of 25% in Table 4. Table 5 exemplarily shows the optimized fan control table that is generated based on Table 4.

TABLE 5

| Duty cycle | Ambient temperature |
|---|---|
| 27% | 56° C. |
| 27% | 55.6° C. |
| 30% | 55° C. |
| 35% | 53° C. |
| 50% | 50° C. |
| 60% | 49° C. |
| 80% | 48° C. |

After the optimized fan control table is stored into the computer system 1 (e.g., into the memory medium accessible by the control unit 15), the control unit 15 can control operation of the fan unit 11 (e.g., determining the duty cycle of the control signal) based on the optimized fan control table and a desired ambient temperature. Accordingly, the impact of the vibration resulting from the fan unit 11 on the disk storage unit 12 can be reduced while the ambient temperature specification for the computer system 1 is still satisfied. Following the previous example, when the ambient temperature is required to be at most 56 degrees Celsius in some specific conditions, the control unit 15 may, based on the optimized fan control table (e.g., Table 5), generate and transmit the control signal with a duty cycle of 27% to control the fan unit 11 to operate at a corresponding fan speed (e.g., 8960 rpm) that is assumed to be capable of maintaining the ambient temperature actually at 55.6 degrees Celsius, which is lower than the required ambient temperature.

It is noted that each of Table 1 through Table 5 can be modified to include more detailed correspondence by performing interpolation. In this embodiment, the vibration values in the reference vibration table may be obtained by using an acceleration meter (not shown) disposed on the disk storage unit 12. The acceleration meter may be built in the disk storage unit 12, or be a handheld apparatus to be disposed on the disk storage unit 12 during the measurement. To obtain the vibration values in the reference vibration table, the control unit 15 controls the fan unit 11 to operate at the desired fan speed values (i.e., those of the first group) one by one; meanwhile, the acceleration meter measures vibration of the disk storage unit 12 as the fan unit 11 operates at the desired fan speed values one by one.

It is noted that the abovementioned steps S1 to S4 may be performed either by the same computer device or different computer devices. Either the computer system 1 itself or other computer devices may be the computer device(s) used to perform some or all of steps S1 to S4, and this disclosure is not limited in this respect. In one implementation, the computer system 1 may store the reference vibration table and the reference fan control table therein, and the control unit 15 of the computer system 1 performs steps S1 to S4 in operation. In one implementation, the control unit 15 of the computer system 1 may acquire the vibration values detected by a vibration sensor of the disk storage unit 12 (i.e., the control unit 15 establishes the reference vibration table by itself), and performs steps S1 to S4 in operation in a real-time manner. For example, upon acquiring a vibration value exceeding the predetermined threshold value from the vibration sensor of the disk storage unit 12, the control unit 15 may immediately generate a forbidden range based on the fan speed value or duty cycle of the control signal that corresponds to that vibration value, and modify the reference fan control table to generate the optimized fan control table.

In summary, the reference fan control table is modified to generate the optimized fan control table based on the relationships among the parameter values of the fan control parameter, the fan speed values, and the vibration values, such that the control unit 15 outputs the control signal with a duty cycle equaling the predetermined parameter value when the duty cycle value to which the desired ambient temperature corresponds in the reference fan control table falls within the forbidden range, thereby preventing transmission of relatively large vibrations to the disk storage unit 12. Accordingly, the influence on the read/write speed of the disk storage unit 12 attributed to rotation of the fan unit 11 may be reduced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for optimizing fan speed control of a computer system that includes a fan unit, a control unit to control operation of the fan unit, and a disk storage unit, the method comprising:
by a computer device, obtaining a reference vibration table that includes multiple vibration values of the disk storage unit respectively corresponding to fan speed values of a first group, of a fan speed of the fan unit;
by a computer device, determining, based on a greatest one of the vibration values in the reference vibration table, a forbidden range corresponding to a range for the fan speed of the fan unit;
by a computer device, obtaining a reference fan control table that includes multiple ambient temperature values corresponding to a second group of fan speed values of the fan speed of the fan unit;
by a computer device, generating an optimized fan control table based on the reference fan control table and the forbidden range by making a part of the ambient temperature values in the reference fan control table change to corresponding to a specific fan speed value; and
by the control unit, controlling the fan speed of the fan unit based on the optimized fan control table;
wherein, in the reference fan control table, said part of the ambient temperature values are in correspondence to apart of the second group of fan speed values that corresponds to the forbidden range; and
wherein the specific fan speed value is not smaller than an upper limit of the range for the fan speed that corresponds to the forbidden range.

2. The method of claim 1, further comprising:
obtaining, by a computer device, a control parameter table that associates the fan speed values of the first group respectively with parameter values of a first group, the parameter values being values of a fan control parameter relevant to a control signal used to control the fan speed of the fan unit;
wherein the forbidden range is a range for the fan control parameter;
wherein the reference fan control table associates the ambient temperature values with a second group of parameter values of the fan control parameter; and
wherein the optimized fan control table is generated by re-associating said part of the ambient temperature values that is, in the reference fan control table, associated with a part of the second group of parameter values that falls within the forbidden range, with a predetermined parameter value for the fan control parameter, the predetermined parameter value corresponding to the specific fan speed value.

3. The method of claim 2, wherein the fan control parameter is a duty cycle of the control signal.

4. The method of claim 2, wherein the forbidden range for the fan control parameter corresponds to a range between a first fan speed and a second fan speed for the fan unit, and has an upper limit and a lower limit that respectively correspond to the second fan speed and the first fan speed and that are related to a tolerance of one of the fan speed values in the first group of fan speed values that corresponds to the greatest one of the vibration values in the reference vibration table.

5. The method of claim 4, wherein the second fan speed is greater than the first fan speed, and the predetermined parameter value is a duty cycle value not smaller than the upper limit of the forbidden range.

6. The method of claim 1, wherein the reference vibration table is obtained by:
by the control unit, controlling the fan unit to operate at the first group of fan speed values one by one;
by an acceleration meter disposed on the disk storage unit, measuring vibration of the disk storage unit as the fan unit operates at the first group of fan speed values one by one, so as to obtain the vibration values in the reference vibration table.

7. A method for optimizing fan speed control of a computer system that includes a fan unit, a control unit to control operation of the fan unit, and a disk storage unit, comprising:
by a computer device, obtaining a reference vibration table that associates fan speed values of a first group, of the fan unit with multiple vibration values of the disk storage unit, respectively;
by a computer device, determining, based on those of the vibration values that are greater than a predetermined threshold value in the reference vibration table, a forbidden range corresponding to a range for a fan speed of the fan unit;
by a computer device, obtaining a reference fan control table that includes multiple ambient temperature values corresponding to a second group of fan speed values of the fan speed of the fan unit;
by a computer device, generating an optimized fan control table based on the reference fan control table and the forbidden range by making a part of the ambient temperature values in the reference fan control table change to corresponding to a specific fan speed value; and
by the control unit, controlling a fan speed of the fan unit based on the optimized fan control table;
wherein, in the reference fan control table, said part of the ambient temperature values are in correspondence to apart of the second group of fan speed values that corresponds to the forbidden range; and
wherein the specific fan speed value is not smaller than an upper limit of the range for the fan speed that corresponds to the forbidden range.

8. The method of claim 7, further comprising:
obtaining, by a computer device, a control parameter table that associates the fan speed values of the first group respectively with parameter values of a first group, the parameter values being values of a fan control parameter relevant to a control signal used to control the fan speed of the fan unit;
wherein the forbidden range is a range for the fan control parameter;
wherein the reference fan control table associates the ambient temperature values with a second group of parameter values of the fan control parameter; and
wherein the optimized fan control table is generated by re-associating said part of the ambient temperature values that is, in the reference fan control table, associated with a part of the second group of parameter values that falls within the forbidden range, with a predetermined parameter value for the fan control parameter, the predetermined parameter value corresponding to the specific fan speed value.

9. The method of claim 8, wherein the fan control parameter is a duty cycle of the control signal.

10. The method of claim 8, wherein the forbidden range for the fan control parameter corresponds to the range between a first fan speed and a second fan speed for the fan unit, and has an upper limit and a lower limit that respectively correspond to the second fan speed and the first fan speed and that are related to a tolerance of one of the fan speed values in the first group of fan speed values that corresponds to a greatest one of the vibration values in the reference vibration table.

11. The method of claim 10, wherein the second fan speed is greater than the first fan speed, and the predetermined parameter value is a duty cycle value not smaller than the upper limit of the forbidden range.

12. The method of claim 7, wherein the reference vibration table is obtained by:
- by the control unit, controlling the fan unit to operate at the first group of fan speed values one by one;
- by an acceleration meter disposed on the disk storage unit, measuring vibration of the disk storage unit as the fan unit operates at the first group of fan speed values one by one, so as to obtain the vibration values in the reference vibration table.

* * * * *